(12) United States Patent
Lady (10) Patent No.: US 8,869,750 B2
(45) Date of Patent: *Oct. 28, 2014

(54) ANIMAL TRAINING APPARATUS (75) Inventor: Linda J. Lady, Fremont, CA (US)

(73) Assignee: LML Holdings, Inc., Union City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/818,595

(22) Filed: Jun. 18, 2010

(65) Prior Publication Data

US 2010/0251972 A1    Oct. 7, 2010

Related U.S. Application Data (63) Continuation of application No. 12/107,049, filed on Apr. 21, 2008, which is a continuation of application No. 11/456,821, filed on Jul. 11, 2006, now Pat. No. 7,387,087, which is a continuation of application No. 10/341,930, filed on Jan. 14, 2003, now Pat. No. 7,107,939.

(60) Provisional application No. 60/392,746, filed on Jun. 27, 2002.

(51) Int. Cl.
A01K 15/02 (2006.01)

(52) U.S. Cl.
USPC ............ 119/792; 119/856; 119/907; 119/905

(58) Field of Classification Search
USPC ......... 119/792, 856, 793, 794, 786, 787, 788, 119/771, 863, 864, 905, 907; 54/71
See application file for complete search history.

(56) References Cited

U.S. PATENT DOCUMENTS

| 1,685,435 | A |   | 9/1928  | Philbrick            |
|-----------|---|---|---------|----------------------|
| 2,026,383 | A |   | 12/1935 | Gyulay               |
| 2,778,335 | A |   | 1/1957  | Hirsch               |
| 3,768,445 | A |   | 10/1973 | Sorrels              |
| 3,769,939 | A |   | 11/1973 | Wais et al.          |
| 4,667,624 | A | * | 5/1987  | Smith ......... 119/770 |
| 4,676,198 | A |   | 6/1987  | Murray               |
| 4,838,206 | A |   | 6/1989  | Anderson et al.      |
| D313,677  | S | * | 1/1991  | Hammon et al. ... D30/152 |
| 5,038,717 | A | * | 8/1991  | Bent .......... 119/815 |

(Continued)

OTHER PUBLICATIONS http://dictionary.reference.com/browse/connector, pp. 2-3, Dec. 1, 2011

(Continued)

Primary Examiner — Yvonne Abbott
(74) Attorney, Agent, or Firm — Peters Verny, LLP (57) ABSTRACT An animal training apparatus is comprised of a leash connector attached to a chest portion of a harness. The harness is arranged to prevent the leash connector from shifting to the back of the animal. The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside. The leash connector is attached to an intermediate position on the chest strap for pulling on the chest portion of the harness. The animal is prevented by the rotational force from pulling further.

15 Claims, 7 Drawing Sheets

(56) References Cited

U.S. PATENT DOCUMENTS

| | | | |
|---|---|---|---|
| 5,199,383 A | | 4/1993 | Lagana |
| 5,243,931 A | * | 9/1993 | McDonough ............... 119/671 |
| 5,247,905 A | * | 9/1993 | Arakawa .................. 119/863 |
| 5,325,819 A | * | 7/1994 | Krauss ..................... 119/792 |
| 5,329,885 A | | 7/1994 | Sporn |
| 5,383,426 A | * | 1/1995 | Krauss ..................... 119/793 |
| 5,433,688 A | * | 7/1995 | Davies ..................... 482/124 |
| 5,511,515 A | | 4/1996 | Brown et al. |
| 5,676,093 A | | 10/1997 | Sporn |
| 5,724,920 A | * | 3/1998 | Meisman et al. ........... 119/771 |
| 5,842,444 A | * | 12/1998 | Perrulli .................... 119/770 |
| 5,893,339 A | | 4/1999 | Liu |
| 5,896,831 A | | 4/1999 | Alpert |
| 5,937,794 A | | 8/1999 | Hediger |
| 6,085,694 A | | 7/2000 | Simon |
| 6,095,094 A | * | 8/2000 | Phillips ................... 119/792 |
| D434,535 S | * | 11/2000 | Koch ...................... D30/152 |
| 6,167,844 B1 | | 1/2001 | Cantrell et al. |
| 6,314,915 B1 | | 11/2001 | Pope et al. |
| 6,371,056 B1 | * | 4/2002 | Phillips ................... 119/793 |
| 6,374,778 B1 | * | 4/2002 | Glussich .................. 119/859 |
| 6,450,129 B1 | * | 9/2002 | Flynn ...................... 119/770 |
| 6,450,130 B1 | | 9/2002 | Goldberg |
| 6,662,753 B1 | * | 12/2003 | Sporn ...................... 119/797 |
| 6,694,923 B1 | * | 2/2004 | Fouche .................... 119/792 |
| 6,773,366 B2 | * | 8/2004 | Gray ....................... 473/458 |
| D511,596 S | * | 11/2005 | Mugford .................. D30/152 |
| 6,984,184 B2 | * | 1/2006 | Gray ....................... 473/458 |
| 7,107,939 B2 | | 9/2006 | Lady |
| 7,228,821 B2 | * | 6/2007 | Okai ....................... 119/863 |
| 7,387,087 B2 | | 6/2008 | Lady |
| D599,504 S | * | 9/2009 | Halip et al. .............. D30/152 |
| 7,886,699 B2 | | 2/2011 | Lady |
| 2005/0009647 A1 | * | 1/2005 | Gray ....................... 473/458 |
| 2006/0102102 A1 | * | 5/2006 | Bennett et al. ............ 119/792 |

OTHER PUBLICATIONS http://dictionary.reference.com/browse/discrete, pp. 2-5, Dec. 1, 2011.

Defendants-Prior-Art_CoastalPetProducts_1-15-13_14pgs.

EP03762316.2, Lady, Linda J., Article 94(3) EPC Communication, Examination Report, Oct. 12, 2011, 4 pages.

EP03762316.2, Lady, Linda J., Response to the Examination Report dated Oct. 12, 2011, Apr. 19, 2012, 13 pages.

Case No. 11-CV-06173-YGR, *LML Holdings, Inc., v. Pacific Coast Distributing, Inc., et al.*, Defendants' Responsive Claim Construction Brief, Filed Jan. 11, 2013, 16 pages.

Case No. 11-CV-06173-YGR, *LML Holdings, Inc. v. Pacific Coast Distributing, Inc., et al.*, Declaration of W. Brent Rasmussin in support of Claim Construction Reply Brief, filed Jan. 16, 2013, 105 pages.

http://www.coastalpet.com/products/product_output.php?Item_Number=6160, Coastal Pet Products, Control Ease Harness, Item No. 6160, 2 pages.

U.S. Appl. No. 12/818,595 Interference Suggestion filed Jun. 18, 2010, 26 pages.

http://www.cardicommentary.de/articles-pativertebrae.htm, 1 page.

Case4:11-cv-06173-YGR, Document 87, *LML Holdings, Inc., v. Pacific Coast Distributing, Inc., et al.*, Amended Joint Claim Construction and Pre-hearing Statement Pursuant to Pat L.R. 4-3, filed Feb. 8, 2013, 4 pages.

Case4:11-cv-06173-YGR, document 90, *LML Holdings, Inc., v. Pacific Coast Distributing, Inc., et al.*, Defendants' Supplemental Claim Construction Brief, filed Feb. 25, 2013, 17 pages.

U.S. Appl. No. 61/717,570, Lady, Linda J., Harness Attachment, filed Oct. 23, 2012.

\* cited by examiner

Fig. 7

ANIMAL TRAINING APPARATUS

CROSS-REFERENCE TO RELATED APPLICATIONS

This application is a continuation of, and claims the priority benefit of, U.S. patent application Ser. No. 12/107,049 filed Apr. 21, 2008 which is a continuation of U.S. patent application Ser. No. 11/456,821 filed Jul. 11, 2006, now U.S. Pat. No. 7,387,087, which is continuation of U.S. patent application Ser. No. 10/341,930 filed Jan. 14, 2003, now U.S. Pat. No. 7,107,939, which claims priority from the provisional U.S. Patent Application No. 60/392,746 filed Jun. 27, 2002. The disclosures of the above applications are incorporated herein by reference.

BACKGROUND

1. Field of the Invention

The invention broadly relates to animal harnesses and leashes.

2. Prior Art

An animal leash is typically connected to a collar worn around the neck of an animal. The collar is free to rotate around the neck. An animal, such as a dog, that has not been trained, instinctively wishes to roam away from its handler. When the dog tries to walk or run away and pulls the leash taut, the collar is automatically rotated so that the leash is positioned at the back of the neck. As the dog pulls the leash taut, it feels pressure on the front of its neck.

Many types of animals have an opposition reflex that makes them instinctively move toward the part of their bodies on which they feel pressure. Since the dog feels pressure at the front part of the collar when he pulls on a leash that has been rotated to the back, the collar encourages the dog to pull away from its handler with even greater force. As another example, the opposition reflex of a horse causes it to turn towards the side where the rider's leg applies pressure.

In addition to collars, there are animal harnesses that wrap around the torso. A typical harness has a leash attachment at the back of the animal, but a back-mounted leash cannot be used to give the animal cues for learning commands such as sit, down, and come. The back-mounted leash also signals the animal to pull on the leash, similar to a neck collar, because of the pressure on the front of the chest when the animals pulls the leash taut. Some prior art harnesses discourage pulling behavior by providing devices that rub, chafe, or hobble the animal's front legs, but these devices cause stress and discomfort.

SUMMARY

Accordingly, the objects of the present animal training apparatus and method are:

to prevent an animal from pulling on its leash;
to facilitate applying turning signals to the animal;
to give an animal cues for learning commands such as sit, down, and come;
to be adjustable for fitting different size animals;
to be comfortable to wear;
to not rub the armpits or forearms; and
to enable the animal to walk freely without hobbling its movements.

The present invention is an animal training apparatus that is comprised of a leash connector attached to a chest portion of a harness. The harness is arranged for preventing the leash connector from shifting to the back of the animal.

The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside.

The leash connector is attached to an intermediate position on the chest strap for controlling an animal by pulling the chest strap in the appropriate direction. For example, it can apply a rotating force to the animal when the animal moves forwards of the handier and pulls on the leash connector. The animal is prevented by the rotational force from pulling further.

By this design, when the animal brings the leash taut, it is not encouraged to pull further by pressure on the chest, but is instead turned by pressure on the sides, thereby discouraging pulling.

DETAILED DESCRIPTION

Figure 1:
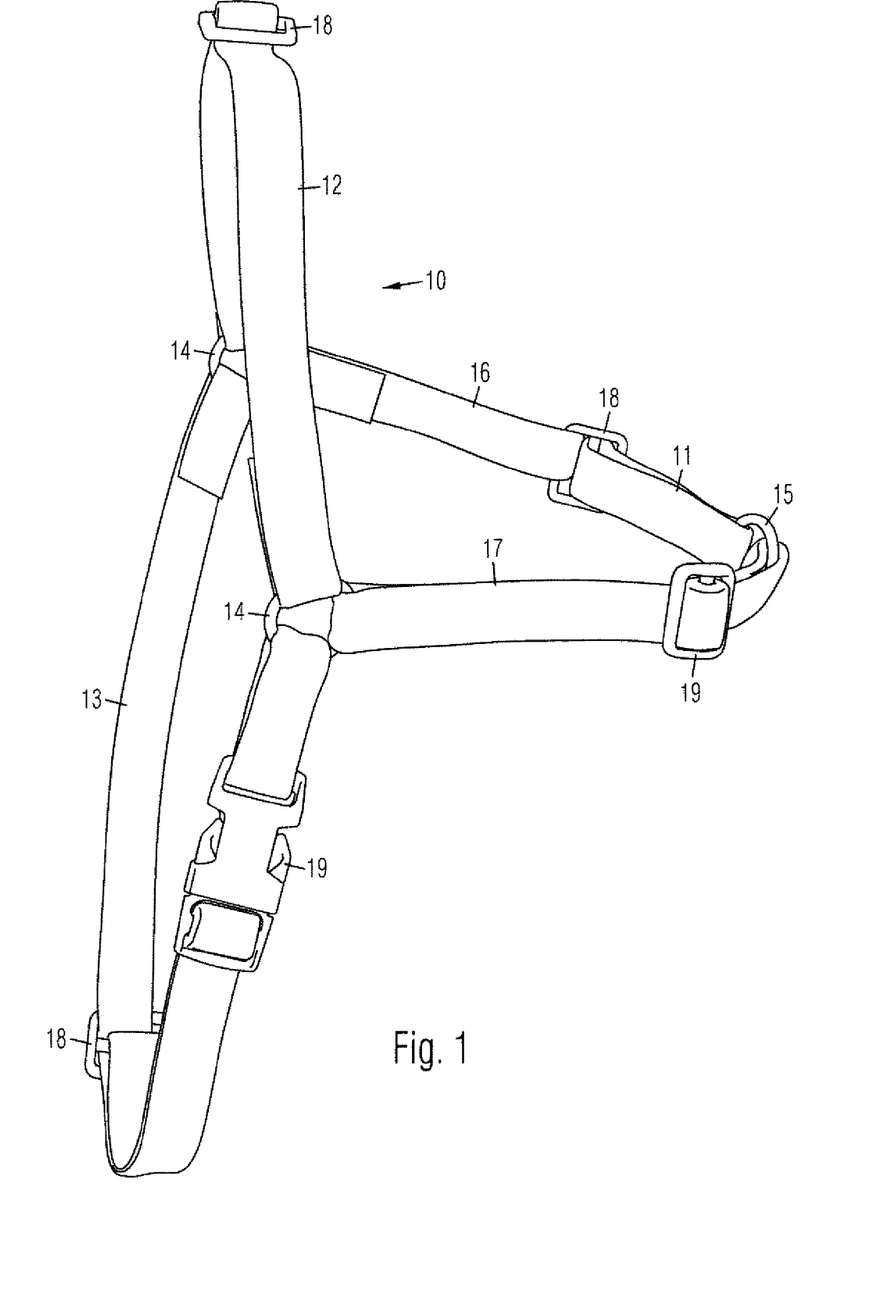
FIG. 1 is a side perspective view of the present invention.

In accordance with a first embodiment of the invention shown in the front view of FIG. 1, an animal harness (10) is comprised of a chest strap (11), a withers strap (12), and a girth strap (13), which are preferably made of webbing. Adjacent ends of the straps (11-13) are connected together, preferably by side connectors (14), which are preferably comprised of rings that allow the chest strap (11) to pivot up and down. Alternatively, the ends of the straps (11-13) may be connected together without a connector, such as by sewing, gluing, or other means, or they may be integrally connected to each other.

A leash connector (15) is attached to an intermediate position on the chest strap (11). In this example, the chest strap (11) is comprised of a left strap (16) and a right strap (17) connected by the leash connector (15), which is comprised of a ring. Alternatively, the chest strap (11) may be comprised of a single strap, and the leash connector (15) may be attached to an intermediate position or any other position on the single strap. Also, the leash connector (15) may be any suitable type of connector for connecting to a leash. There may be a plurality of leash connectors on the chest strap (11).

The withers strap (12) and the girth strap (13) each includes at least one length adjuster (18), such as a slide buckle, for adjusting its length to fit different size animals. The chest strap (11) preferably includes two width adjusters (18) on either side of the leash connector (15), so as to enable adjusting the length of the chest strap (11), and preferably maintaining the leash connector (15) generally centered along the chest strap (11). Alternatively, the length adjusters (18) may be eliminated and the straps (11-13) may be sized to fit an animal of a predetermined size.

A releasable connector (19) is attached along one of the straps (11-13), preferably a girth strap (13). An identification tag (not shown) or a cord (not shown) may be attached to the leash connector (15) for connecting a leash.

Figure 2:
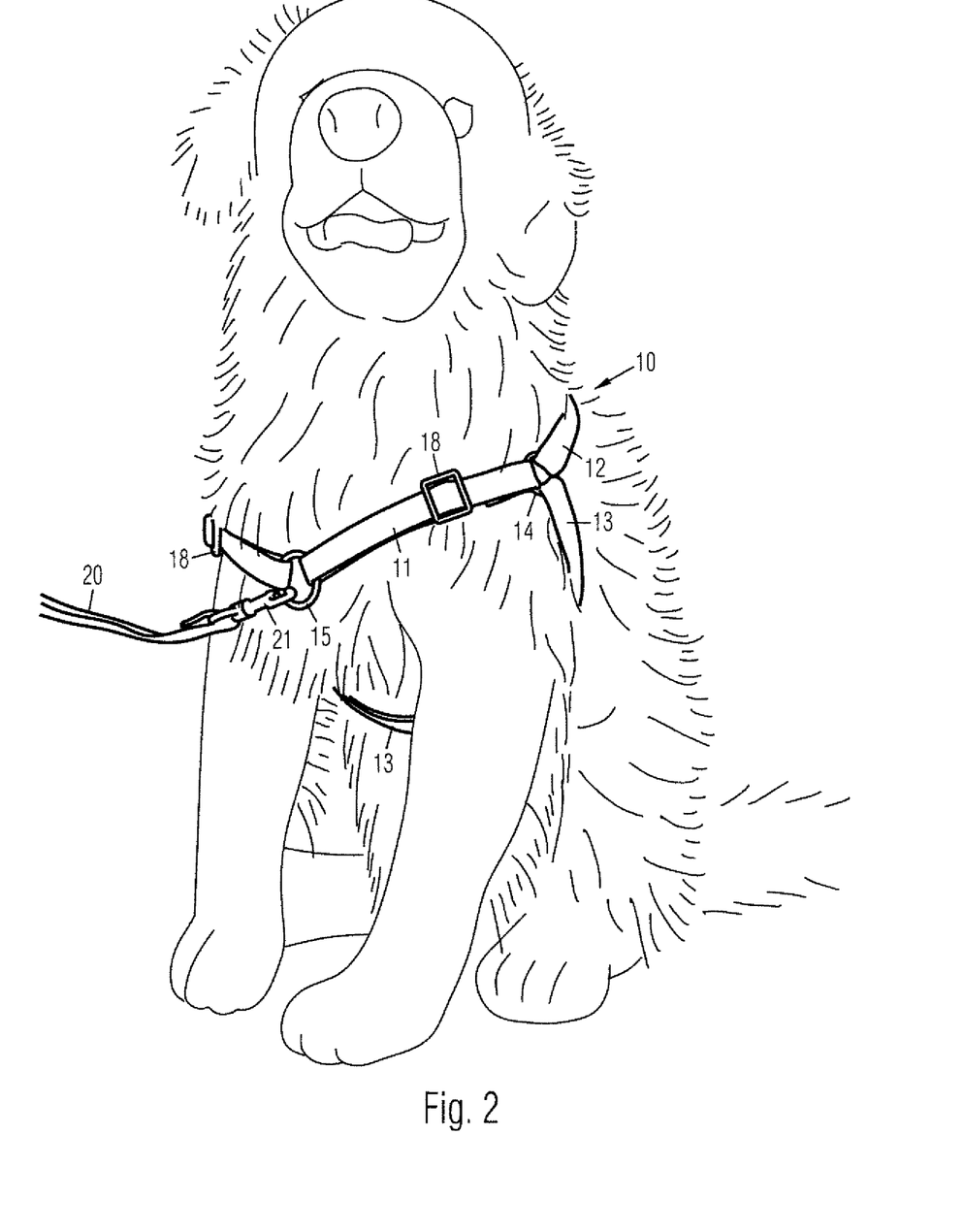
FIG. 2 is a front perspective view of the invention on an animal.
Figure 3:
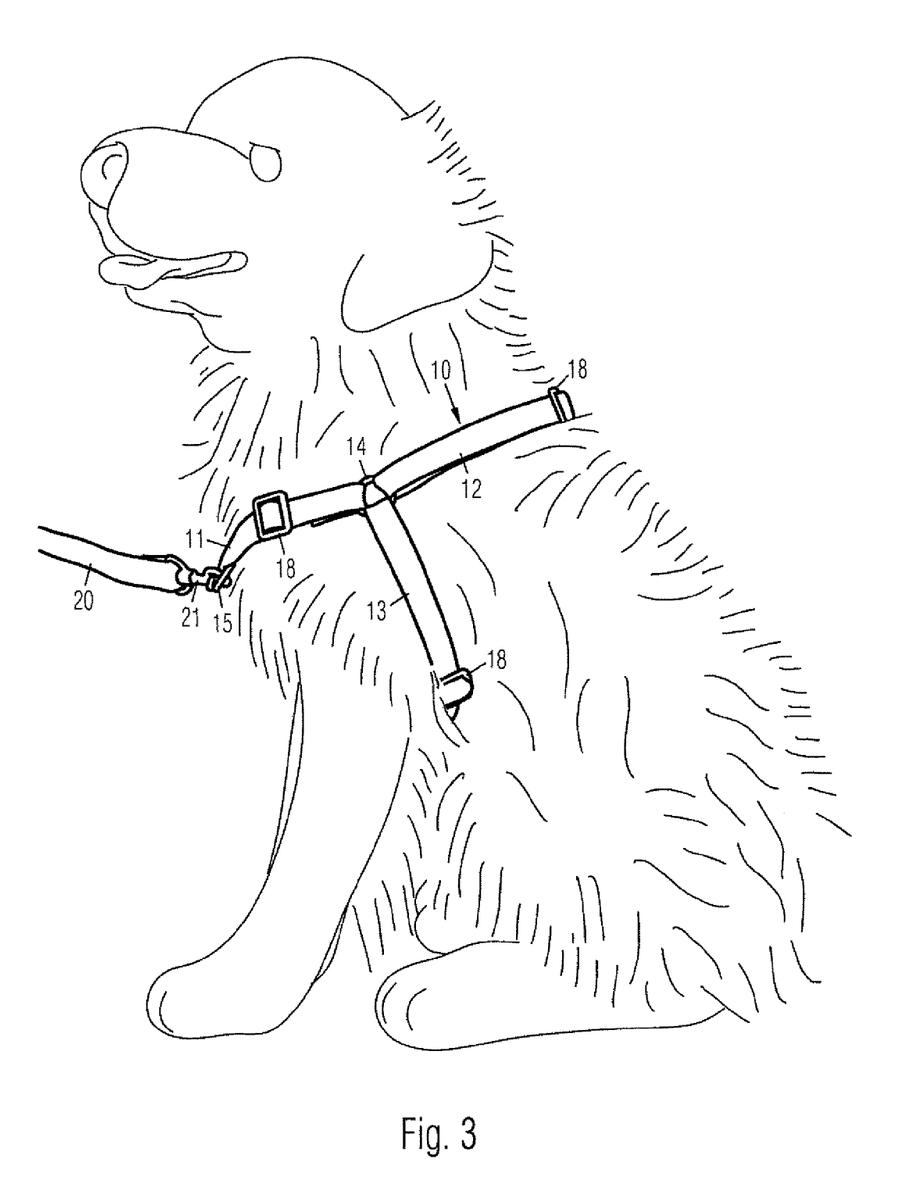
FIG. 3 is a side view of the invention on the animal.

In FIGS. 2 and 3, a harness (10) is shown worn on animal, which is a dog in this example. The harness (10) is most suitable for dogs, but it may be used for other four legged animals. A releasable connector (19) (FIG. 1) is disconnected for enabling the harness (10) to be put on the animal by sliding the chest strap (11) and the withers strap (12) down around its neck without lifting its legs. The releasable connector (19) is reconnected after the chest strap (11) and the withers strap (12) are in position. The chest strap (11) is positioned across the animal's chest, which is the portion between the tops of the front legs. The withers strap (12) is positioned across the withers, which is the portion between the shoulders behind the neck. The girth strap (13) is positioned across the girth, which is the portion on the underside behind the front legs. A leash (20) with a releasable connector (21) at the proximal end is connected to the leash connector (15) on the chest strap (11).

Length adjusters (18) on the straps (11-13) are adjusted to fit the animal. Side connectors (14) are generally positioned at the shoulders where the animal can easily feel them for receiving turning signals. The chest strap (11) is preferably adjusted to be loose enough for pivoting up and down about side connectors (14). The harness (10) is comfortable to wear because it may be worn relatively loosely, and because it does not rub the armpits or forearms like some prior art harnesses do. Accordingly, it allows the animal to walk freely without hobbling its movements.

Figure 4:
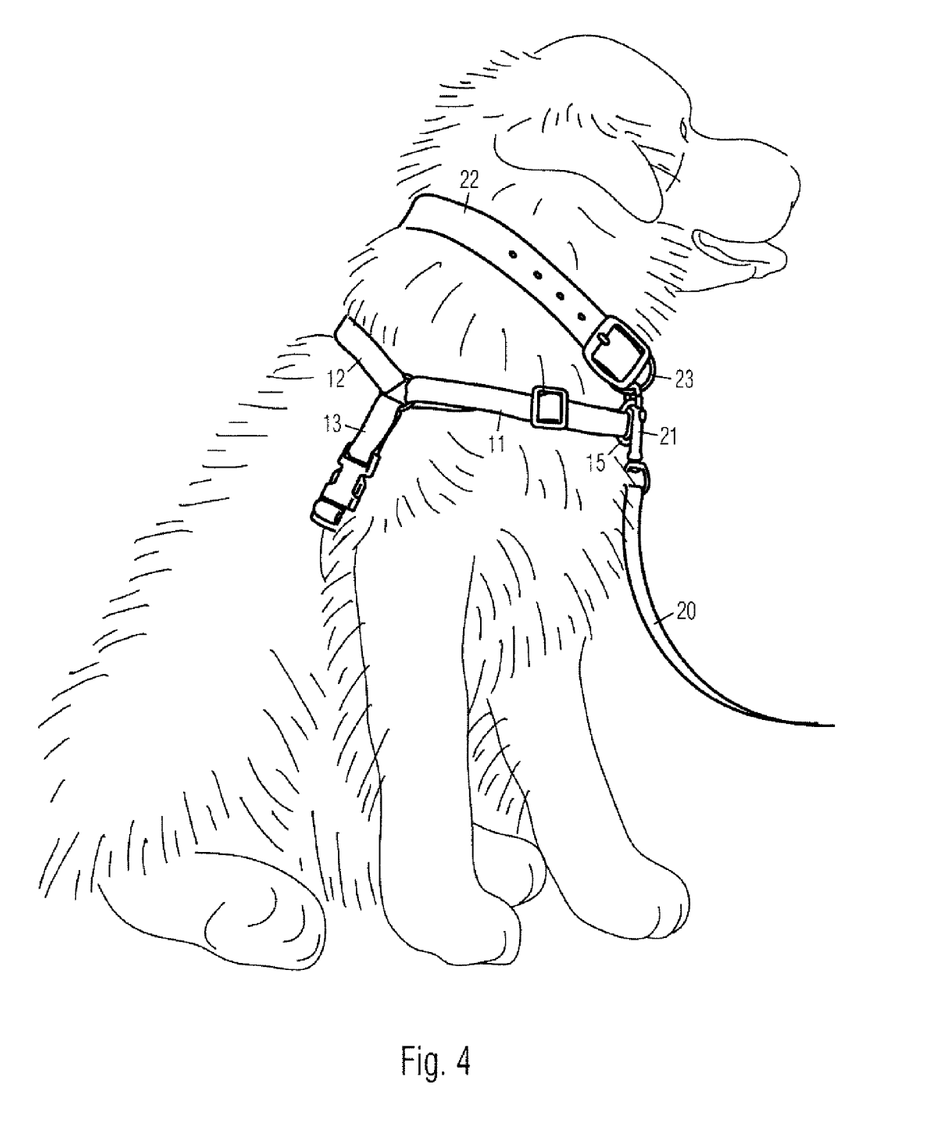
FIG. 4 is a side view of an alternative embodiment of the invention.

An alternative embodiment of the harness is shown in FIG. 4. It includes a collar (22) worn above a chest strap (11) and a withers strap (12). A leash connector (23) on collar (22) is connected to a leash connector (15) on the chest strap (11) by releasable connector (21) on the leash. The collar (22) provides additional control and signaling, as well as enabling an easier transition for an animal owner who is accustomed to using a collar alone. When the owner is familiar with using the harness, the collar (22) may be removed.

Figure 5:
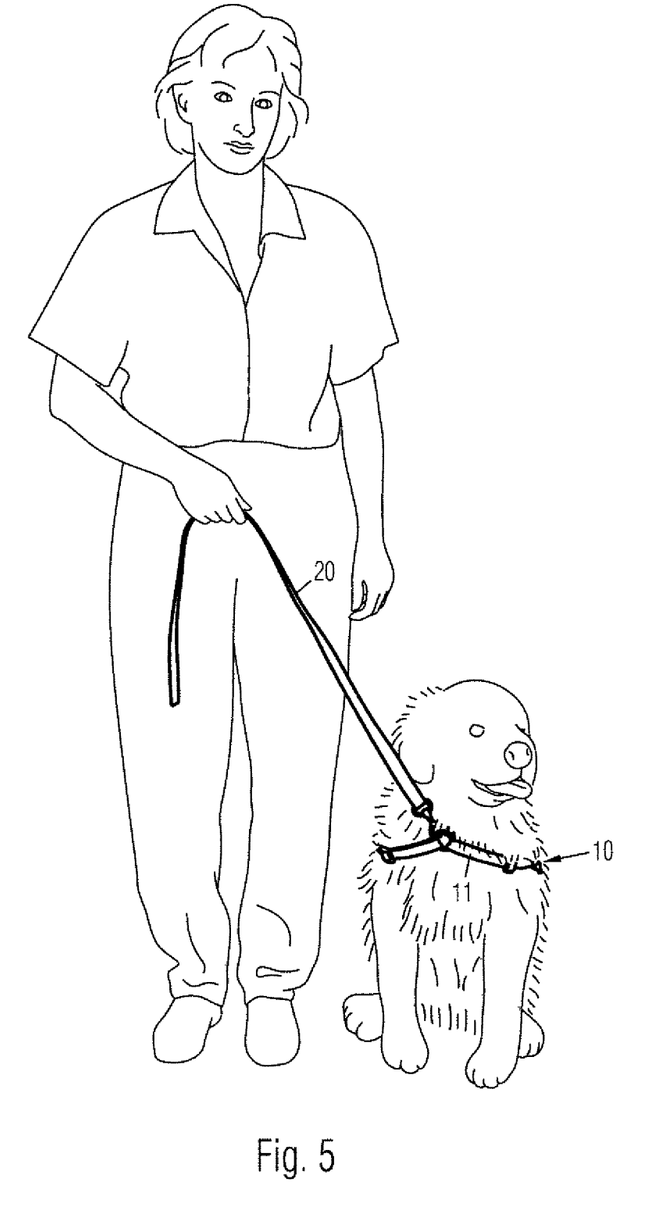
FIG. 5 is a front view of the invention when the animal is being instructed to proceed forward.
Figure 6:
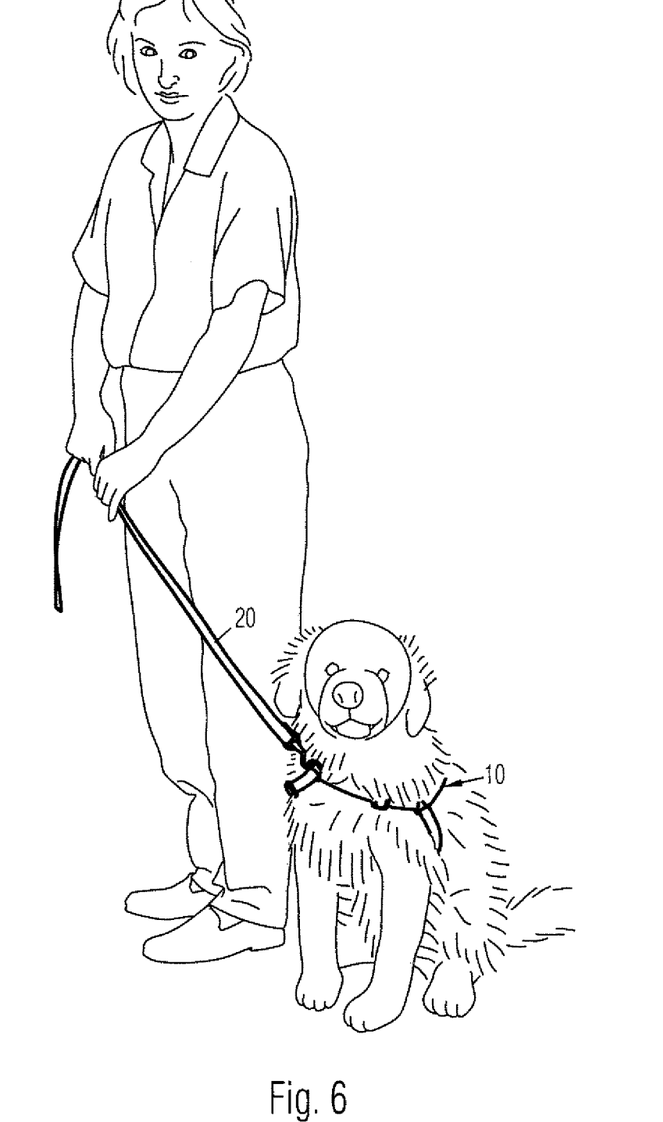
FIG. 6 is a front view the invention when the animal is being instructed to turn right.
Figure 7:
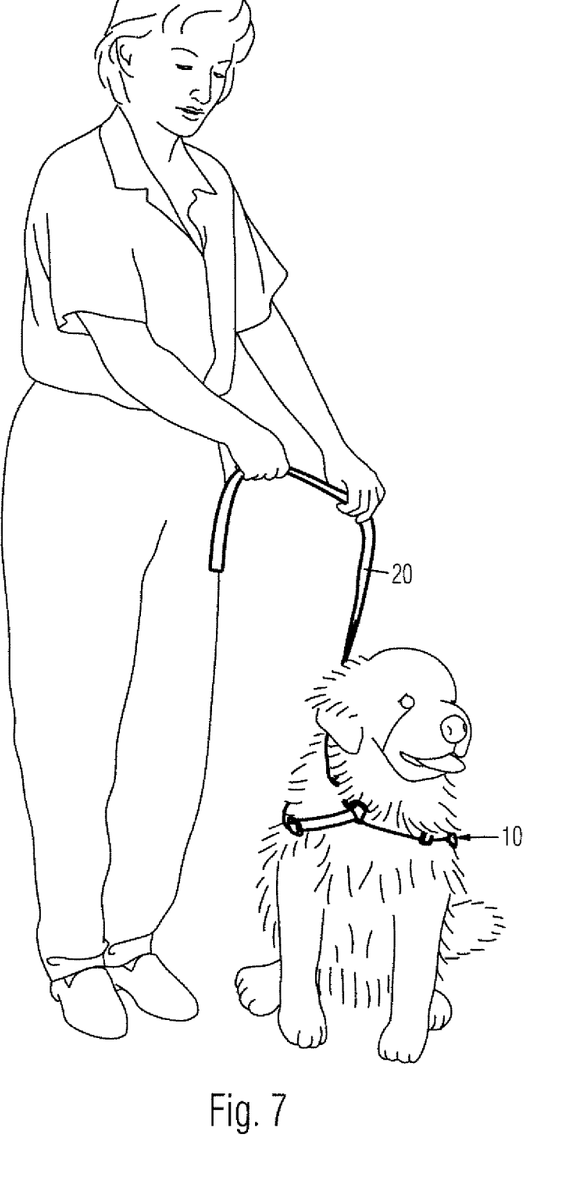
FIG. 7 is a front view invention when the animal is being instructed to turn left.

A method for training the animal wearing a harness (10) is shown in FIGS. 5-7. As an example, a trainer is shown on the right of the animal, but the trainer may be on the left instead.

In FIG. 5, the animal is instructed to proceed forward by pulling a leash (20) forward to apply pressure on the animal's withers and girth. If the animal moves forwards of the trainer and pulls the leash (20) taut, the leash connector (15) (FIG. 1) and the leash (20) apply a force to the sides and shoulders of the animal to produce a rotational effect on the animal since the leash connector (15) and the leash (20) are attached to the chest strap (11). The animal is signaled to turn toward the trainer and stopped from pulling on the leash (20).

The harness (10) eliminates the signals that prior art leashes and harnesses provide to cause the animal to pull on the leash (20). The animal will quickly learn to walk with the trainer instead of forcing its way ahead and pulling on the leash (20). The animal is instructed to sit or to stop walking by pulling the leash (20) upward to apply pressure on the animal's girth.

In FIG. 6, the animal is instructed to turn right by pulling the leash (20) to the right to apply pressure to the animal's left shoulder. In FIG. 7, the animal is instructed to turn left by pulling the leash (20) to the left to apply pressure to the right side of the animal's neck. If the animal is on the trainer's right side, the animal is instructed to turn right by pulling the leash (20) to the right to apply pressure to the left side of the animal's neck.

Although the above description is specific, they should not be considered as limitations on the scope of the invention, but only as examples of the embodiments. Many substitutes and variations are possible within the teachings of the invention. For example, the harness may be used with a collar or without the leash by grabbing the chest strap and pulling it in the appropriate direction. A collar may be considered as being comprised of a chest strap and a withers strap. The buckles may be replaced with hook-and-loop fasteners. A different harness may be provided for securing the leash connector at the chest of the animal. Therefore, the scope of the invention should be determined by the appended claims and their legal equivalents, not by the examples given.

What is claimed is:

1. A dog harness comprising:
   a torso-encircling strap dimensioned and configured to extend around the torso of a dog;
   a plurality of first connectors each coupled to the torso-encircling strap; and
   a chest strap adapted for positioning across the chest of the dog anterior to the dog's sternum and coupled to said first connectors, said chest strap comprising:
   a first length defining a first connecting strap having a posterior end coupled to one of said first connectors, and a far end,
   a second length separate and spaced apart from said first length and defining a second connecting strap having a posterior end coupled to another of said first connectors, and a far end,
   first and second anterior connectors respectively coupled to the far ends of said first and second connecting straps, and
   at least one loop of selected length, separate and discrete from said first and second lengths and
   having an attachment member adapted for coupling to a leash,
   each of the at least one loop extending through and slidably received by one of said first and second anterior connectors whereby a pulling force applied to said attachment member causes shifting of said at least one loop relative to said anterior connector, said attachment member comprising a ring retained on said loop and with a portion of the loop extending through said ring.

2. The dog harness of claim 1, wherein the torso-encircling strap includes a shoulder strap and a torso strap separate from said shoulder strap.

3. The dog harness of claim 2, wherein the shoulder strap and the torso strap are connected by the first connectors.

4. The dog harness of claim 2, wherein at least one of the torso strap and the shoulder strap include a length adjustor configured for adjusting the length of the torso strap or the shoulder strap.

5. The dog harness of claim 2, wherein at least one of the shoulder strap and the torso strap includes a releasable connector.

6. The dog harness of claim 2, wherein the first connectors are separate from and interconnect the torso strap, the shoulder strap and respectively the posterior ends of each of the first and second lengths, and are configured to inhibit transverse movement of the posterior ends of said first and second lengths relative to said torso strap and said shoulder strap.

7. The dog harness of claim 2, wherein the first and second lengths each include adjustment members configured for adjusting the first and second lengths independent of one another.

8. The dog harness of claim 1, wherein the attachment member is fixed to the at least one loop.

9. A dog harness comprising:
    a torso-encircling strap configured for positioning across the withers of the dog and for positioning across the girth of the dog behind the front legs on the underside;
    a first side connector attached to the torso-encircling strap to be generally positioned at a first shoulder of the dog;
    a second side connector attached to the torso-encircling strap to be generally positioned at a second shoulder of the dog;
    a chest strap
        including a first end attached to first side connector and a second end attached to second side connector, and configured for positioning across the chest of the dog between the tops of the front legs; and
    a leash connector attached to an intermediate position on the chest strap.

10. The dog harness of claim 9, wherein the torso-encircling strap includes a shoulder strap and a torso strap separate from said shoulder strap, the shoulder strap and the torso strap being connected by the first connectors.

11. The dog harness of claim 9, wherein the torso-encircling strap includes a shoulder strap and a torso strap separate from said shoulder strap, at least one of the torso strap and the shoulder strap including a length adjustor configured for adjusting the length of the torso strap or the shoulder strap.

12. The dog harness of claim 9, wherein the leash connector attached to the chest strap at a fixed position.

13. A dog harness consisting of:
    a back strap, having first and second ends, configured for positioning across the withers of the dog;
    a first side connector attached to the first end of the back strap;
    a second side connector attached to the second end of the back strap;
    a girth strap, having a first end attached to the first side connector and having a second end attached to the second side connector, the girth strap configured for positioning across the girth of the dog behind the front legs on the underside;
    a chest strap
        including a first end attached to first side connector and a second end attached to second side connector, and configured for positioning across the chest of the dog between the tops of the front legs; and
    a leash connector attached to an intermediate position on the chest strap.

14. A dog harness comprising:
    a torso-encircling strap dimensioned and configured to extend around the torso of a dog;
    a plurality of first connectors each coupled to the torso-encircling strap; and
    a chest strap adapted for positioning across the chest of the dog anterior to the dog's sternum and coupled to said first connectors, said chest strap comprising:
        a first length defining a first connecting strap having a posterior end coupled to one of said first connectors, and a far end,
        a second length separate and spaced apart from said first length and defining a second connecting strap having a posterior end coupled to another of said first connectors, and a far end,
        first and second anterior connectors respectively coupled to the far ends of said first and second connecting straps, and
        at least two loops of selected lengths, discrete from said first and second lengths and having an attachment member adapted for coupling to a leash,
        each of the at least two loops extending through and slidably received by one of said first and second anterior connectors whereby a pulling force applied to said attachment member causes shifting of said at least two loops relative to said anterior connector, said attachment member comprising a ring retained on said loop and with a portion of the loop extending through said ring.

15. A dog harness comprising:
    a torso-encircling strap dimensioned and configured to extend around the torso of a dog;
    a plurality of first connectors each coupled to the torso-encircling strap; and
    a chest strap adapted for positioning across the chest of the dog anterior to the dog's sternum and coupled to said first connectors, said chest strap comprising:
        a first length defining a first connecting strap having a posterior end coupled to one of said first connectors, and a far end,
        a second length separate and spaced apart from said first length and defining a second connecting strap having a posterior end coupled to another of said first connectors, and a far end,
        first and second anterior connectors respectively coupled to the far ends of said first and second connecting straps, and
        at least two loops of selected lengths and having an attachment member adapted for coupling to a leash,
        each of the at least two loops extending through and slidably received by one of said first and second anterior connectors whereby a pulling force applied to said attachment member causes shifting of said at least two loops relative to said anterior connector, said attachment member comprising a ring retained on said loop and with a portion of the loop extending through said ring.

* * * * *